(12) United States Patent
Feldinger

(10) Patent No.: US 11,407,323 B2
(45) Date of Patent: Aug. 9, 2022

(54) CONTACT UNIT FOR A CHARGING STATION AND METHOD FOR CONTACTING

(71) Applicant: SCHUNK TRANSIT SYSTEMS GMBH, Bergheim (AT)

(72) Inventor: Martin Feldinger, Seekirchen am Wallersee (AT)

(73) Assignee: Schunk Transit Systems GmbH, Bergheim (AT)

( * ) Notice: Subject to any disclaimer, the term of this patent is extended or adjusted under 35 U.S.C. 154(b) by 434 days.

(21) Appl. No.: 16/477,936

(22) PCT Filed: Jan. 11, 2018

(86) PCT No.: PCT/EP2018/050676
§ 371 (c)(1),
(2) Date: Jul. 15, 2019

(87) PCT Pub. No.: WO2018/130618
PCT Pub. Date: Jul. 19, 2018

(65) Prior Publication Data
US 2019/0366863 A1    Dec. 5, 2019

(30) Foreign Application Priority Data
Jan. 16, 2017  (DE) .................. 10 2017 200 593.9

(51) Int. Cl.
*B60L 53/30*    (2019.01)
*B60L 5/36*    (2006.01)

(52) U.S. Cl.
CPC ............... *B60L 53/30* (2019.02); *B60L 5/36* (2013.01)

(58) Field of Classification Search
CPC ................................... B60L 53/30; B60L 5/36
(Continued)

(56) References Cited

U.S. PATENT DOCUMENTS

| 2014/0070767 A1* | 3/2014 | Morris | B60L 53/16 320/109 |
| 2016/0167530 A1* | 6/2016 | Bolik | B60L 53/30 320/108 |
| 2017/0080813 A1* | 3/2017 | Bedell | B60L 5/36 |

FOREIGN PATENT DOCUMENTS

| CN | 101580024 A | 11/2009 |
| DE | 173934 C | 7/1906 |

(Continued)

OTHER PUBLICATIONS

English Machine Translation of CN101580024A dated Nov. 18, 2009.

(Continued)

*Primary Examiner* — Nathaniel R Pelton
(74) *Attorney, Agent, or Firm* — Dickinson Wright PLLC; Andrew D. Dorisio

(57) ABSTRACT

A contact unit for a charging station of an electrically driven vehicle and a related method. The contact unit includes at least two charging contact supports having at least two charging contacts thereon and connected by a parallel linkage having connecting and support rods disposed in parallel, each support rod being connected to the connecting rods in one of two parallel movement planes via connecting hinges forming a parallelogram with the connecting rods, the connecting rods connected to a base support by support hinges spaced apart in a support plane extending in parallel and centrically to the movement planes, each charging contact support being connected to the support rod via a rotary hinge, the rotary hinges being orthogonally disposed with respect to the connecting hinges, each charging contact support mounting the charging contacts coaxially with respect to the axis of rotation.

12 Claims, 2 Drawing Sheets

(58) Field of Classification Search
USPC .......................................................... 320/109
See application file for complete search history.

(56) References Cited

FOREIGN PATENT DOCUMENTS

| | | | |
|---|---|---|---|
| DE | 102013201491 | * | 7/2014 |
| DE | 102013201491 A1 | | 7/2014 |
| DE | 102013202671 A1 | | 8/2014 |
| DE | 102014213831 A1 | | 1/2016 |
| DE | 102016205012 A1 | | 9/2017 |
| EP | 3031658 A1 | | 6/2016 |

OTHER PUBLICATIONS

English Machine Translation of DE102013201491A1 dated Jul. 31, 2014.
English Machine Translation of DE102013202671A1 dated Aug. 21, 2014.
English Machine Translation of DE102014213831A1 dated Jan. 21, 2016.
English Machine Translation of DE102016205012A1 dated Sep. 28, 2017.
English Machine Translation of DE173934C dated Jul. 28, 1906.
English Machine Translation of EP3031658A1 dated Jun. 15, 2016.

* cited by examiner

CONTACT UNIT FOR A CHARGING STATION AND METHOD FOR CONTACTING

FIELD OF THE INVENTION

The invention relates to a contact unit for a charging station of an electrically driven vehicle and a method for forming an electrically conductive connection between the vehicle, in particular an electric bus or the like, and the charging station, the contact unit being formed disposable above a vehicle, wherein electrical charging contacts of the contact unit are movable by means of the contact unit with respect to contact surfaces of the vehicle and contact can be established between the charging contacts and the contact surfaces, the contact unit having at least two charging contact supports having at least two charging contacts disposed thereon, the charging contact supports being connected to each other via a parallel linkage of the contact unit having two connecting rods disposed in parallel and having two support rods disposed in parallel, each support rod being connected to the connecting rods in one of two parallel movement planes via connecting hinges which are spaced apart from each other and forming a parallelogram with the connecting rods.

BACKGROUND OF THE INVENTION

Such contact units and methods are known from the state of the art and are regularly used in electrically driven vehicles which run between stops. Said vehicles can be electric busses but, in principle, also other vehicles, such as a train or a streetcar, which are not permanently electrically connected to a contact wire or the like. In these vehicles, an electrical energy store is charged by a charging station during a break at a stop. At the stop, the vehicle is connected electrically to the charging station, the energy store being charged at least to such an extent that the vehicle can reach the next stop to be approached having a charging station. In order to establish an electrical connection between the vehicle and the charging station a contact unit is used which is mounted or positioned above the vehicle at the respective stop. Then, a charging contact of the charging station is moved in the direction of a contact surface on a roof of the vehicle and an electrical connection is established. For example, a contact unit can provide at least four charging contacts, wherein then regularly two charging contacts can serve for energy transmission, one charging contact as a ground conductor and another charging contact for data transmission. With this type of vehicle contacting, all charging stations along a route have to be provided with a corresponding contact unit, which is why the contact unit should be especially cost-effective, dependable and at the same time low-maintenance.

When joining the charging contacts with the respective contact surfaces of the vehicle it is essential that the charging contact is pressed on the contact surface with a defined contact force so that a safe electrical connection can be formed. For example, from the DE 10 2013 201 491 A1 there is known a contact unit for disposal above a vehicle, the contact unit comprising two parallel linkages, each having two charging contacts. An adjustment drive actuates a parallel linkage so that the charging contacts are movable with respect to a contact surface on a roof of the vehicle.

With the known contact units it is always disadvantageous that they have to be formed or disposed for a defined contact height, that is a distance from the contact unit, in a retracted position for storing the charging contacts with respect to a contact position for transmitting current to the vehicle. That means that a relative distance of possible contact positions and the retracted position is only usable in narrow limits and has to be regularly adjusted or adapted by design changes since, otherwise, the necessary or desired contact force cannot be applied to the contact surface. Furthermore, it is important that a vehicle can be loaded differently and thus can be inclined with respect to the contact unit or the charging contacts. In addition, in particular busses can be lowered in the area of a stop in order to facilitate the access for, for example, people with a physical impairment. This lowering of the bus, which may be on one side, causes a height change or an inclination of a contact surface with respect to the road if the bus is only lowered on one side. Moreover, a ground of the stop or a road can be inclined with respect to the contact unit. Therefore, a vehicle can be tilted or inclined about its longitudinal axis and/or its transverse axis under the contact unit at the stop. Consequently, then, the contact surfaces on a roof of the vehicle are inclined with respect to the charging contacts in the horizontal and in the vertical direction because the vehicle is tilted.

It may be possible to establish an electrical connection between the respective charging contacts and the contact surfaces, if also the contact unit is inclinable, but, then, a contact force exerted by the contact unit via the charging contacts on the contact surfaces is distributed in an extremely different manner Therefore, it is hardly possible to establish the contact force of the charging contacts desired for a safe electrical connection at the contact surfaces of the vehicle in all described cases of an inclination of the vehicle. Thus, there is inter alia the risk of lifting a charging contact off a contact surface during a charging process, the risk of forming an undesirably high resistance between the charging contact and the contact surface and the risk of forming an electric arc between the charging contact and the contact surface.

SUMMARY OF THE INVENTION

The object of the invention is therefore to propose a contact unit and a method for forming an electrically conductive connection between a vehicle and a charging station that facilitate safe contacting of the vehicle.

This object is attained by a contact unit having the features of claim 1, by a charging station having the features of claim 12 and by a method having the features of claim 13.

The contact unit for a charging station of an electrically driven vehicle, in particular an electric bus or the like, according to the invention is formed disposable above a vehicle, wherein electrical charging contacts of the contact unit are movable by means of the contact unit with respect to contact surfaces of the vehicle and contact can be established between the charging contacts and the contact surfaces, the contact unit having at least two charging contact supports having at least two charging contacts disposed thereon, the charging contact supports being connected to each other via a parallel linkage of the contact unit having two connecting rods disposed in parallel and having two support rods disposed in parallel, each support rod being connected to the connecting rods in one of two parallel movement planes via connecting hinges which are spaced apart from each other and forming a parallelogram with the connecting rods, the connecting rods being connected to a base support of the contact unit via two support hinges spaced apart from each other in a support plane extending in parallel and centrically to the movement planes, each charging contact support being connected to the support rod via a rotary hinge, the rotary hinges being orthogonally disposed with respect to the connecting hinges, each charging contact support mounting the charging contacts coaxially with respect to the axis of rotation.

Thus, the contact unit is a part of a stationary charging station for an electrically driven vehicle and serves to move each of the at least four charging contacts of the charging station to a contact surface of the vehicle, which is preferably disposed on a vehicle roof, and to establish electrical contact between the charging contact and the contact surface. Thus, it is then possible to supply the vehicle with electrical energy during a break at a charging station and to store the energy in the vehicle. The movement of the charging contacts to the contact surface and back is performed by the contact unit or an articulated arm device of the contact unit. For this purpose, the charging contacts are disposed at a lower end of the contact unit, wherein the charging contacts can be moved from an upper retracted position for storing the charging contacts to a lower contact position for transmitting current or contacting the contact surfaces. Thereby, in the contact position, the contact unit forms a defined and essentially equal contact force on the respective contact surfaces.

The contact unit has a base support which is connected via two support hinges to a parallel linkage and mounts it in the center. The parallel linkage is formed of comparatively long connecting rods and short support rods, which are disposed vertically and connected to the connecting rods via the connecting hinges. Thus the connecting rods can be inclined with respect to a horizontal plane, the support rods always being disposed vertically within the two parallel movement planes. Since the connecting hinges are coaxially disposed to the support hinges, there is always an even force distribution of a contact force centrally exerted on the base support on the two support rods regardless of an inclination of the connecting rods.

Each charging contact support is disposed on the support rods via the rotary hinge. Since the charging contacts are also coaxially disposed on the respective charging contact support with respect to the rotary hinge, the contact force can be distributed proportionally to each one of the two charging contacts disposed on the charging contact support. As the rotary hinges are orthogonally disposed with respect to the connecting hinges, it is possible to adjust the charging contacts to a transverse and longitudinal inclination of a vehicle in their height with respect to the vehicle and, at the same time, achieve by simple means a safe contacting of all contact surfaces of the vehicle with an equal proportional contact force.

Thus, a contact force evenly distributed to the charging contacts can be exerted on said charging contacts via the base support. If there are four charging contacts, the quadruple contact force can be introduced into the parallel linkage via the base support or the contact force introduced into the parallel linkage via the base support can be distributed in four equal parts to the charging contacts.

The charging contacts can be formed as contact strips which can each be disposed in parallel with respect to each other at the charging contact supports, wherein the charging contact supports can be disposed in parallel with respect to each other. In particular due to the parallel disposal, it can always be ensured that the contact force is evenly distributed to the charging contacts. The contact strips can be contacted on a roof of a vehicle simply by means of contact surfaces which are also strip-shaped or rail-shaped. Preferably, the contact strips can run transversely, in particular orthogonally, with respect to the contact rails. Even if a vehicle stops at a charging station in such a manner that the contact strips come into contact with the rail-shaped contact surfaces on the vehicle outside their center, referring to their length, the contact force can be evenly distributed.

Thus, it is advantageous when the contact strips are disposed transversally to the driving direction of the vehicle. Contact surfaces or contact rails on the roof of the vehicle can then be disposed in the driving direction of the vehicle. Alternatively, the contact strips can be disposed in the driving direction of the vehicle, and the contact surfaces or the contact rails on the roof of the vehicle can be disposed transversally to the driving direction of the vehicle.

The contact unit can furthermore have an articulated arm device and a drive device for driving the articulated arm device. The articulated arm device can be a pantograph or a link which can be actuated by means of an adjustment drive of the drive device. The adjustment drive can be a pneumatic, a hydraulic or an electric drive which, for example, can cooperate with springs of a spring means of the drive device. Thus, it is then also possible to position the articulated arm device via the drive device with respect to the contact surfaces in such a manner that the desired contact force is formed via the contact device on the contact surfaces. In particular, the base support can be disposed or mounted on a lower end of the articulated arm device. In principle, the contact unit can therefore have any device which allows mounting and a relative motion of the base support and establishment of a contact force relative to the contact surfaces.

Thus, the base support can be connected via at least a retaining hinge to an articulated arm device of the contact unit. The retaining hinge can allow a swiveling of the base support with respect to the charging station. Alternatively, then a rigid connection between the articulated arm device and the contact unit can be provided.

Thus, the base support can be disposed vertically and can be rigidly connected to the articulated arm device. Thus, it can be ensured that the parallel linkage does not undesirably swivel with respect to the articulated arm device for example because of wind.

The contact unit can have an alignment means by means of which, in a retracted position of the contact unit for storing the charging contacts, the charging contacts are alignable from a contact position to a horizontal storage position. If, for example, there has been established contact between the charging contacts and the contact surfaces of a vehicle roof inclined with respect to the charging station, it is advantageous to put the charging contacts into an essentially horizontal position or to position it in a common horizontal plane before resuming contact with the vehicle or with another vehicle.

The alignment means can be formed as a stop for the charging contact support. Thus, it is then possible to move the charging contact support against the stop or the stops in the retracted position, whereby, then, the charging contact supports and the parallel linkage can be realigned into an initial position. Such a stop or such stops for the charging contact support are especially easy to design at a charging station.

Alternatively or additionally, the contact unit can have spring means by means of which the charging contact supports can be adjustable on the parallel linkage and/or by means of which the parallel linkage can be adjustable on the base support. The spring means can have leaf springs and/or coil springs and also elastic elements by means of which a spring force can be applied to the charging contact supports on the parallel linkage and/or the parallel linkage itself on the base support when there is a deviation from a horizontal position. Thus, even before reaching a retracted position and immediately after leaving a contact position, it is possible to correspondingly adjust the charging contacts in a common horizontal plane. However, a spring force must not be great enough for the respective contact force of the charging contact to be significantly influenced by the spring force.

Furthermore, it is advantageous when the parallel linkage and/or the charging contact supports on the parallel linkage is and/or are inclinable by up to +/−5° with respect to a horizontal plane. Then, it also is possible to limit an inclination.

The stationary charging station for electrically driven vehicles, in particular electric busses or the like, according to the invention is provided with a contact unit according to the invention. Further embodiments of the charging station are provided by the dependent claims referring to claim 1.

In the method for forming an electrically conductive connection between a vehicle, in particular an electric bus or the like, and a charging station according to the invention, electric charging contacts of the contact unit are moved above a vehicle with respect to contact surfaces of the vehicle by means of a contact unit of the charging station and contact can be established between the charging contacts and the contact surfaces, the contact unit having at least two charging contact supports disposed parallel to each other, each having at least two charging contacts disposed thereon in parallel to each other, the charging contacts being moved from a retracted position of the contact unit for storing the charging contacts into a contact position of the contact unit for forming electrical contact pairs between the charging contacts and the contact surfaces, equal contact forces of the charging contacts being exerted on the contact surfaces via the contact unit in the contact position. With regard to the advantageous effects of the method according to the invention, reference is made to the description of the advantages of the device according to the invention.

In the method an equal contact force of the charging contacts can be exerted on the contact surfaces when the contact surfaces are disposed in an inclined manner with respect to a horizontal plane.

Further advantageous embodiments of the method are provided by the dependent claims referring to claim 1.

BRIEF DESCRIPTION OF THE DRAWING FIGURES

Below, preferred embodiments of the invention are explained in more detail with reference to the accompanying drawings.

Figure 1:
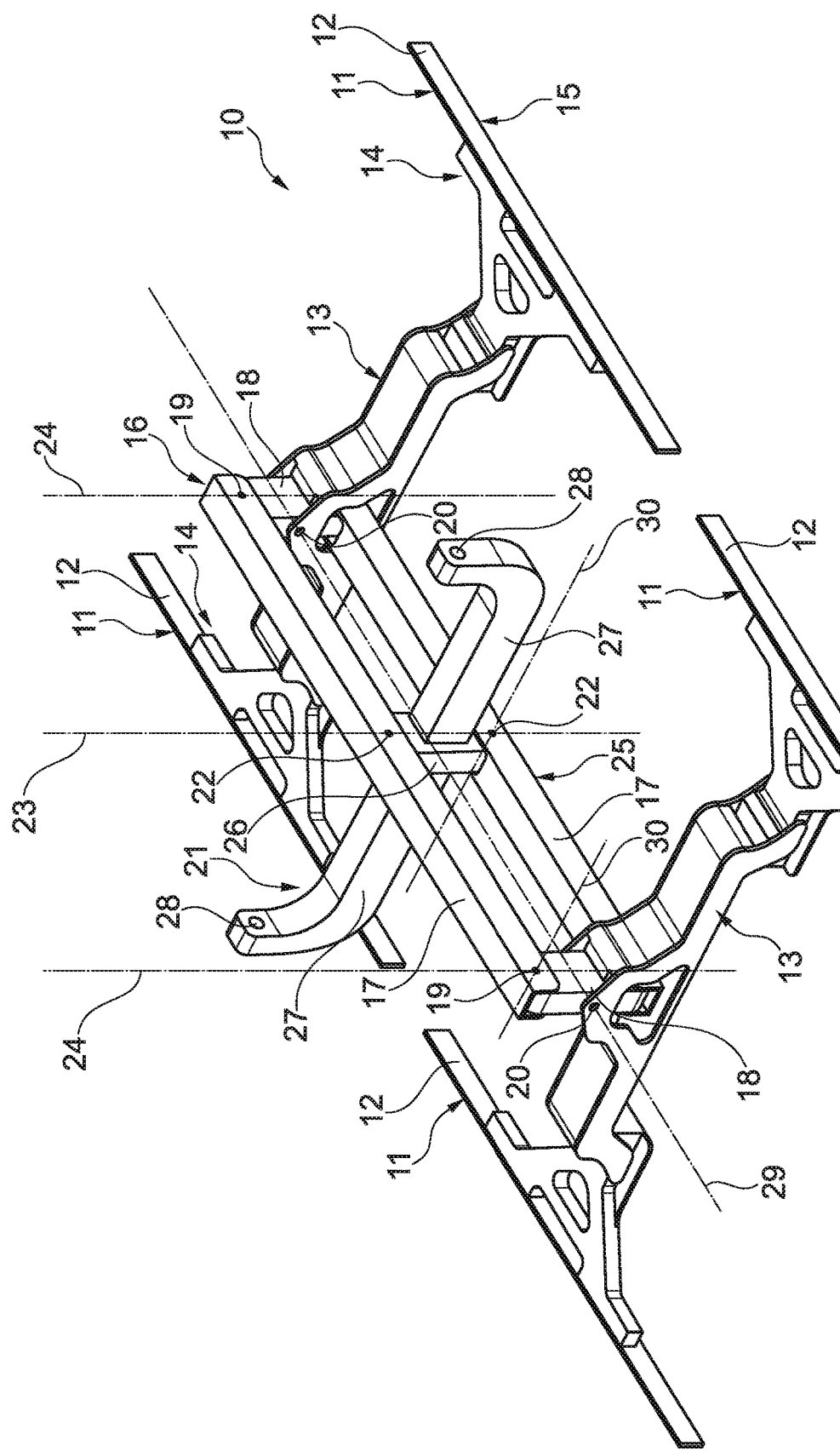
FIG. 1 shows a contact unit in a perspective view.

FIG. 1 shows a contact unit 10 for a charging station of an electrically driven vehicle, contact unit 10 having in total four charging contacts 11 formed as contact strips 12. Furthermore, contact unit 10 has two charging contact supports 13 to whose distal ends 14 contact strips 12 are fixed. Thus, it is possible to establish electrical contact between contact rails on a roof of a vehicle, which are not illustrated here, and a bottom 15 of contact strips 12.

DETAILED DESCRIPTION OF THE INVENTION

Charging contact supports 13, which are essentially arcuate or U-shaped, are connected to a parallel linkage 16 of contact unit 10 which is formed of connecting rods 17 and vertically disposed support rods 18. Connecting rods 17 are movably connected to support rods 18, each charging contact support 13 being movably connected to support rods 18 via a rotary hinge 20.

A base support 21 of contact unit 10 is movably connected to connecting rods 17 via support hinges 22. Support hinges 22 are disposed in a vertical support plane 23, the connecting hinges being disposed in vertical movement planes 24. Movement planes 24 are regardless of a position or an inclination of a parallelogram 25 formed by parallel linkage 16 always disposed in parallel or coaxially to support plane 23.

Base support 21 has a support rod portion 26 having two projecting arms 27. On each arm 27, there is formed a bore hole 28 for the connection of an articulated arm device of contact unit 10, which is not illustrated here. In particular, rotary hinges 20 are disposed orthogonally with respect to connecting hinges 19 so that a longitudinal axis 29 of rotary hinges 20 runs transversally or at a right angle to transverse axes 30 of connecting hinge 19.

Figure 2:
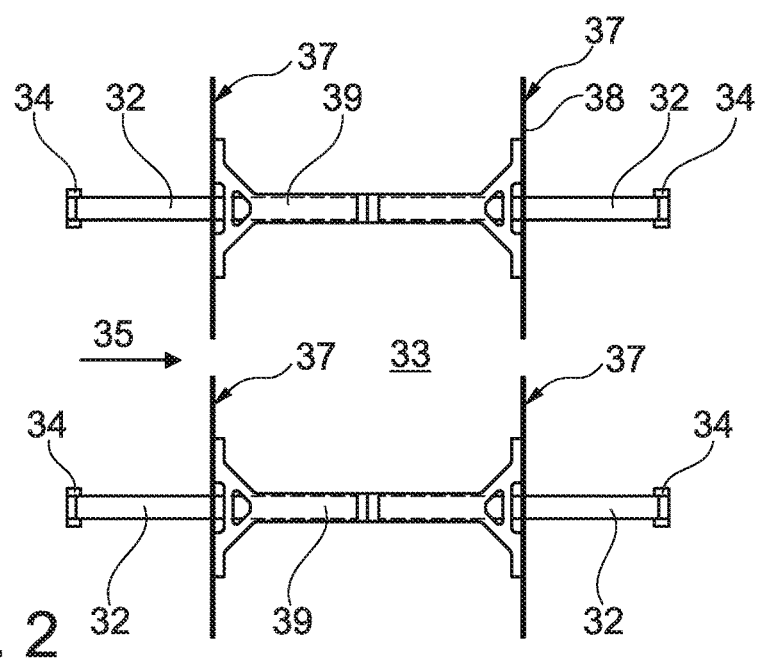
FIG. 2 shows a schematic diagram of another contact unit having contact rails of a vehicle in a top view.
Figure 3:
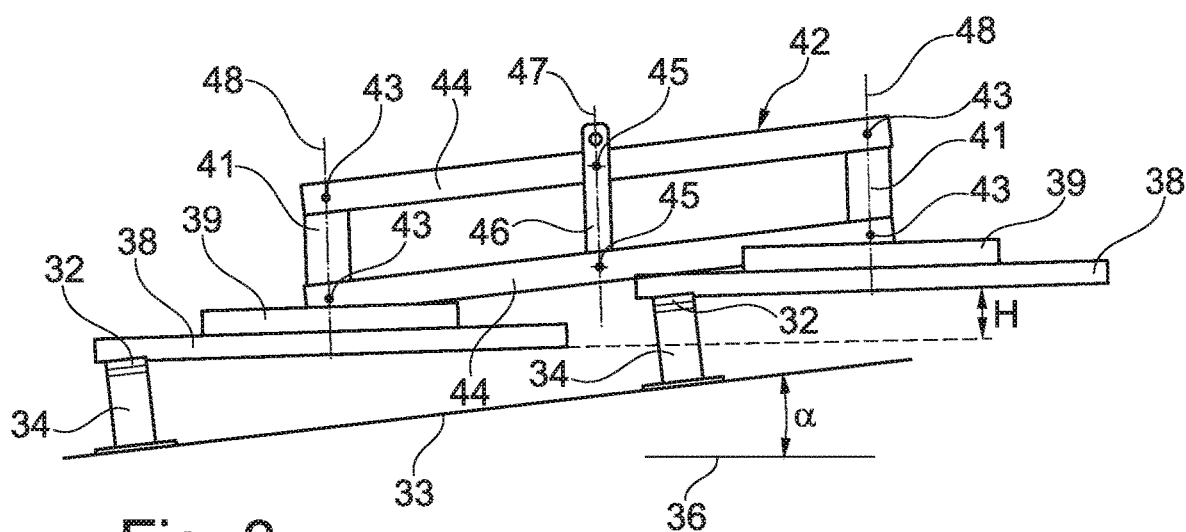
FIG. 3 shows the contact unit from FIG. 2 having the contact rails in a front view.
Figure 4:
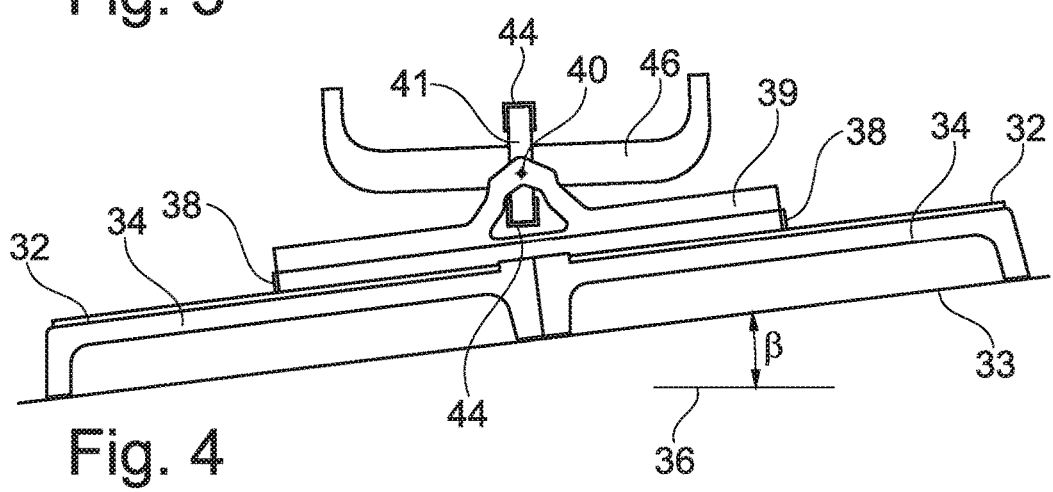
FIG. 4 shows the contact unit from FIG. 2 having the contact rails in a side view.

An overview of FIGS. 2 to 4 shows another contact unit 31 in a schematic diagram together with contact rails 32 which are disposed on a roof 33 of a vehicle, which is not illustrated in detail here, in a driving direction marked by an arrow 35. Each contact rail 32 is positioned on bow-shaped holders 34 in parallel to roof 33. Roof 33 is inclined by an angle $\alpha$ in a transverse direction of the vehicle with respect to the driving direction marked by arrow 35 and by an angle $\beta$ in a longitudinal direction of the vehicle with respect to a horizontal plane 36. The inclination here is not more than ±5°.

Contact unit 31 comprises four charging contacts 37 which are formed as contact strips 38 and are fixed on charging contact supports 39. Charging contact supports 39 are in turn swivel-mounted on support rods 41 of a parallel linkage 42 via rotary hinges 40. Support rods 41 are connected to connecting rods 44 via connecting hinges 43. Connecting rods 44, for their part, are movably connected to an essentially rigid base support 46 via support hinges 45 in such a manner that parallel linkage 42 can be tilted or inclined with respect to a vertical support plane 47. Support rods 41 then move in movement planes 48, which are always parallel and equidistant to support plane 47. Thus, it is possible to form a height difference H of contact strips 38 in the transverse direction of the vehicle when the contact force is evenly distributed between contact rails 32 and respective contact strips 38. It is also possible to swivel charging contact supports 39 about rotary hinge 40, which runs in the transvers direction of the vehicle, transversely to the vehicle so that therefrom also results an even force distribution while there is, at the same time, a safe electrical contact between contact strips 38 and contact rails 32.

The invention claimed is:

1. A contact unit (10, 31) for a charging station of an electrically driven vehicle, the contact unit being formed disposable above a vehicle, wherein electrical charging contacts (11, 37) of the contact unit are movable by means of the contact unit with respect to contact surfaces (32) of the vehicle and contact can be established between the charging contacts and the contact surfaces, the contact unit having at least two charging contact supports (13, 39) having at least two charging contacts disposed thereon, the charging contact supports being connected to each other via a parallel linkage (16, 42) of the contact unit having two connecting rods (17, 44) disposed in parallel and having two support rods (18, 41) disposed in parallel, each support rod being connected to the connecting rods in one of two parallel movement planes (24, 48) via connecting hinges (19, 43) which are spaced apart from each other and forming a parallelogram (25) with the connecting rods, characterized in that the connecting rods are connected to a base support (21, 46) of the contact unit via two support hinges (22, 45) spaced apart from each other in a support plane (23, 47) extending in parallel and centrically to the movement planes, each charging contact support being connected to the support rod via a rotary hinge (20, 40), the rotary hinges being orthogonally disposed with respect to the connecting hinges, each charging contact support mounting the charging contacts coaxially with respect to the axis of rotation.

2. The contact unit according to claim 1, characterized in that a contact force evenly distributed to the charging contacts (11, 37) is exertable via the base support (21, 46).

3. The contact unit according to claim 1, characterized in that the charging contacts (11, 37) are formed as contact strips (12, 38), which are each disposed in parallel with respect to each other at the charging contact supports (13, 39), the charging contact supports being disposed in parallel with respect to each other.

4. The contact unit according to claim 3, characterized in that the contact strips (12, 38) are disposed transversely to the driving direction (35) of the vehicle.

5. The contact unit according to claim 1, characterized in that the contact unit (10, 31) has an articulated arm device and a drive device for driving the articulated arm device.

6. The contact unit according to claim 1, characterized in that the base support (21, 46) is connected to an articulated arm device of the contact unit via at least a retaining hinge.

7. The contact unit according to claim 5, characterized in that the base support (21, 46) is rigidly connected to the articulated arm device.

8. The contact unit according to claim 1, characterized in that the contact unit (10, 31) has an alignment means by means of which, in a retracted position of the contact unit for storing the charging contacts, the charging contacts (11, 37) are alignable from a contact position to a horizontal storage position.

9. The contact unit according to claim 8, characterized in that the alignment means is formed as a stop for the charging contact supports (13, 39).

10. The contact unit according to claim 1, characterized in that the contact unit (10, 31) has spring means by means of which the charging contact supports (13, 39) are alignable to the parallel linkage (16, 42) and/or the parallel linkage is alignable to the base support (21, 46).

11. The contact unit according to claim 1, characterized in that the parallel linkage (16, 42) and/or the charging contact supports (13, 39) on the parallel linkage are formed inclinable by up to ±5° with regard to a horizontal plane (36).

12. A stationary charging station for electrically driven vehicle having a contact unit (10, 31) according to claim 1.

* * * * *